United States Patent
Yang et al.

(10) Patent No.: US 10,471,457 B2
(45) Date of Patent: Nov. 12, 2019

(54) INSPECTION UNIT, INSPECTION METHOD, AND SUBSTRATE TREATING APPARATUS INCLUDING THE SAME

(71) Applicant: Semes Co., Ltd, Cheonan-si, Chungcheongnam-do (KR)

(72) Inventors: Keunhwa Yang, Hwaseong-si (KR); Yoon Jong Ju, Cheonan-si (KR); Kihoon Choi, Cheonan-si (KR); Kwangsup Kim, Asan-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 268 days.

(21) Appl. No.: 15/010,242

(22) Filed: Jan. 29, 2016

(65) Prior Publication Data

US 2016/0221021 A1 Aug. 4, 2016

(30) Foreign Application Priority Data

Jan. 30, 2015 (KR) .................. 10-2015-0014984

(51) Int. Cl.
| | |
|---|---|
| H01L 21/66 | (2006.01) |
| B05C 11/00 | (2006.01) |
| B05B 17/06 | (2006.01) |
| B05B 1/14 | (2006.01) |
| B05B 13/02 | (2006.01) |
| B05B 14/44 | (2018.01) |

(52) U.S. Cl.
CPC ............ *B05B 17/0623* (2013.01); *B05B 1/14* (2013.01); *B05B 13/0228* (2013.01); *B05B 14/44* (2018.02)

(58) Field of Classification Search
CPC ... B05B 1/14; B05B 13/0228; B05B 15/1259; B08B 1/00
See application file for complete search history.

(56) References Cited

U.S. PATENT DOCUMENTS

| | | | |
|---|---|---|---|
| 2003/0142310 A1* | 7/2003 | Bedard | G01N 15/0618 356/338 |
| 2003/0203493 A1* | 10/2003 | Lemme | G01N 1/312 422/64 |

(Continued)

FOREIGN PATENT DOCUMENTS

| | | |
|---|---|---|
| CN | 1512940 A | 7/2004 |
| CN | 101706629 A | 5/2010 |

(Continued)

*Primary Examiner* — Joseph L. Perrin
*Assistant Examiner* — Irina Graf
(74) *Attorney, Agent, or Firm* — Harness, Dickey & Pierce, P.L.C.

(57) ABSTRACT

A substrate treating apparatus includes a treatment unit including a container, and a support member in the interior of the container to support a substrate, the treatment unit being configured to treat the substrate a nozzle unit having a treatment liquid nozzle for supplying a treatment liquid to the substrate provided in the treatment unit and an inspection unit that inspects whether the treatment liquid is normally discharged from the treatment liquid nozzle. The nozzle further includes a nozzle driver that moves the treatment liquid nozzle from a process position at which the substrate is treated by the treatment unit and an inspection position at which the treatment liquid nozzle is inspected by the inspection unit.

20 Claims, 11 Drawing Sheets

(56) References Cited

U.S. PATENT DOCUMENTS

| | | | |
|---|---|---|---|
| 2004/0109038 A1* | 6/2004 | Newsome | B41J 29/393 |
| | | | 347/19 |
| 2005/0078138 A1 | 4/2005 | Koyama | |
| 2008/0100809 A1* | 5/2008 | Nakashima | H01L 21/6715 |
| | | | 355/27 |
| 2008/0158300 A1* | 7/2008 | Nakagawa | B41J 2/01 |
| | | | 347/51 |
| 2010/0207989 A1* | 8/2010 | Govyadinov | B41J 2/125 |
| | | | 347/19 |
| 2014/0261577 A1 | 9/2014 | Furukawa et al. | |
| 2014/0261586 A1* | 9/2014 | Sato | H01L 21/67051 |
| | | | 134/56 R |
| 2015/0099059 A1* | 4/2015 | Harjee | B41J 2/07 |
| | | | 427/8 |

FOREIGN PATENT DOCUMENTS

| | | | |
|---|---|---|---|
| JP | 2000233495 A | * | 8/2000 |
| JP | 2007-088262 A | | 4/2007 |
| JP | 2014-197653 A | | 10/2014 |
| KR | 20140004878 A | | 1/2014 |
| KR | 20140076288 A | | 6/2014 |
| KR | 20140112400 A | | 9/2014 |
| KR | 10-1536722 B1 | | 7/2015 |
| KR | 101567195 B1 | | 11/2015 |

* cited by examiner

INSPECTION UNIT, INSPECTION METHOD, AND SUBSTRATE TREATING APPARATUS INCLUDING THE SAME

CROSS-REFERENCE TO RELATED APPLICATIONS

A claim for priority under 35 U.S.C. § 119 is made to Korean Patent Application No. 10-2015-0014984 filed Jan. 30, 2015, in the Korean Intellectual Property Office, the entire contents of which are hereby incorporated by reference.

BACKGROUND

The inventive concept relates to an inspection unit, an inspection method, and a substrate treating apparatus including the same, and more particularly to an inspection unit that inspects a discharge state of a nozzle, an inspection method, and a substrate treating apparatus including the inspection unit.

In order to manufacture a semiconductor device or a liquid crystal display, various processes such as photolithography, etching, ashing, ion implantation, and thin film deposition are performed on a substrate. In order to eliminate foreign substances and particles produced in the processes, a cleaning process of cleaning the substrate are performed is carried out before or after the various processes.

Meanwhile, a number of processes of a substrate treating process includes supplying liquid to a substrate and treating the substrate. In general, when liquid is supplied to a substrate, it is supplied through a nozzle over the substrate.

Meanwhile, the liquid discharged from the nozzle is inspected by the way that light is irradiated to a tip end of the nozzle, and the liquid discharged is photographed by camera situated beside the nozzle. However, in the inspection method, light may be scattered according to the location of the camera and the location of light, and an image photographed at a site distant from the light or the camera may be distorted or have an error due to the spreading phenomenon of the light, making it difficult to perform a precise inspection.

SUMMARY

The inventive concept provides an inspection unit that inspects a nozzle for supplying treatment liquid to a substrate, an inspection method, and a substrate treating apparatus including the same.

The inventive concept provides an apparatus that treats a substrate.

According to an embodiment of the inventive concept, the substrate treating apparatus may include a treatment unit including a container, and a support member situated in the interior of the container to support a substrate, the treatment unit being configured to treat the substrate; a nozzle unit having a treatment liquid nozzle for supplying a treatment liquid to the substrate provided in the treatment unit; and an inspection unit that inspects whether the treatment liquid is normally discharged from the treatment liquid nozzle. The nozzle unit further comprises a nozzle driver that moves the treatment liquid nozzle from a process position at which the substrate is treated by the treatment unit and an inspection position at which the treatment liquid nozzle is inspected by the inspection unit. The inspection unit may include a plate of a transparent material, a photographing member situated below the plate, a light source member that irradiates light onto a path of the treatment liquid discharged from the treatment liquid nozzle towards the plate at the inspection position, and a determination member that determines whether the treatment liquid is normally discharged, from an image photographed by the photographing member.

According to an embodiment of the inventive concept, the substrate treating apparatus may further include the inspection unit further includes a diffusion preventing plate that restricts the light width of the light irradiated from the light source member.

According to an embodiment of the inventive concept, a slit may be formed in the diffusion preventing plate, and a light width may be restricted by the slit.

According to an embodiment of the inventive concept, the treatment liquid nozzle may include a plurality of discharge holes, and a width of the slit may be provided to correspond to the distance between the outermost discharge holes of the discharge holes when viewed from a side on which the light is irradiated.

According to an embodiment of the inventive concept, the diffusion preventing plate may be situated closer to the treatment liquid nozzle than the light source member when viewed from the top.

According to an embodiment of the inventive concept, the inspection unit may further include a rotation driving unit that rotates the plate about the center thereof.

According to an embodiment of the inventive concept, the photographing member may be situated between a central area and a peripheral area of the plate.

According to an embodiment of the inventive concept, the light source member and the photographing member may be arranged such that a direction in which the light is irradiated and a direction in which the photographing member is photographed are perpendicular to each other.

According to an embodiment of the inventive concept, the photographing member may be situated to face the treatment liquid nozzle situated at the inspection position.

According to an embodiment of the inventive concept, the inspection unit may further include a driver that moves the light source member upwards and downwards.

According to an embodiment of the inventive concept, the treatment liquid nozzle may include a plurality of discharge holes, and the light source member may be arranged such that if the treatment liquid nozzle is situated at the inspection position, the path of the light passes through a location adjacent to the discharge holes.

According to an embodiment of the inventive concept, the light irradiated from the light source member may be a laser ray.

According to an embodiment of the inventive concept, the inspection unit may further include a cleaning nozzle that supplies a cleaning liquid to the plate such that the treatment liquid supplied onto the plate is eliminated.

According to an embodiment of the inventive concept, the cleaning nozzle may supply the cleaning liquid to the center of the plate.

According to an embodiment of the inventive concept, the cleaning nozzle may be situated on one side of an imaginary line passing through the center of the plate, the treatment liquid nozzle and the photographing member may be situated on an opposite side of the imaginary line, and the discharge line of the cleaning nozzle may be inclined towards the center of the plate.

According to an embodiment of the inventive concept, the inspection unit may further include a cup provided to surround the plate.

According to an embodiment of the inventive concept, the treatment liquid nozzle may include a body having an ejection passage through which the treatment liquid flows in the interior thereof, and a discharge hole connected to the ejection passage to eject the treatment liquid; and a vibrator that pressurizes the treatment liquid flowing through the ejection passage in the body and is situated above the ejection passage.

The inventive concept provides an inspection unit that inspects whether a treatment liquid is normally discharged from a treatment liquid nozzle for supplying the treatment liquid to a substrate.

According to an embodiment of the inventive concept, the inspection unit may include a plate of a transparent material, a photographing member situated below the plate, a light source member that irradiates light onto a path of the treatment liquid discharged from the treatment liquid nozzle towards the plate at the inspection position; and a determination member that determines whether the treatment liquid is normally discharged, from an image photographed by the photographing member.

According to an embodiment of the inventive concept, the inspection unit may further include a diffusion preventing plate that restricts a light width of the light irradiated from the light source member.

According to an embodiment of the inventive concept, a slit may be formed in the diffusion preventing plate, and the light width is restricted by the slit.

According to an embodiment of the inventive concept, the inspection unit may further include a rotation driving unit that rotates the plate about the center thereof.

According to an embodiment of the inventive concept, the inspection unit may further include a rotation driving unit that rotates the plate.

According to an embodiment of the inventive concept, the light source member and the photographing member may be arranged such that a direction in which the light is irradiated and a direction in which the photographing member is photographed are perpendicular to each other.

According to an embodiment of the inventive concept, the photographing member may be situated between a central area and a peripheral area of the plate.

According to an embodiment of the inventive concept, the inspection unit may further include a driver that moves the light source member upwards and downwards.

According to an embodiment of the inventive concept, the inspection unit may further include a cleaning nozzle that supplies a cleaning liquid to the plate such that the treatment liquid supplied onto the plate is eliminated.

According to an embodiment of the inventive concept, the cleaning nozzle may supply the cleaning liquid to the center of the plate.

According to an embodiment of the inventive concept, the cleaning nozzle may be situated on one side of an imaginary line passing through the center of the plate, and the treatment liquid nozzle and the photographing member may be situated on an opposite side of the imaginary line, and the discharge line of the cleaning nozzle is inclined towards the center of the plate.

According to an embodiment of the inventive concept, the inspection unit may further include a cup provided to surround the plate.

According to an embodiment of the inventive concept, the light irradiated from the light source member may be a laser ray.

The inventive concept provides an inspection method that inspects whether a treatment liquid is normally discharged from a treatment liquid nozzle for supplying the treatment liquid to a substrate.

According to an embodiment of the inventive concept, the inspection method may include discharging the treatment liquid to a plate of a transparent material, irradiating light onto a path in which the treatment liquid is discharged, photographing the treatment liquid on a light path with a photographing member from the lower side of the plate, and determining whether the treatment liquid is normally discharged from the photographed image.

According to an embodiment of the inventive concept, the plate may be rotated while the treatment liquid is discharged.

According to an embodiment of the inventive concept, the treatment liquid nozzle may include a plurality of discharge holes, and a light width of the light may be restricted by a diffusion preventing plate having a slit.

According to an embodiment of the inventive concept, the light width may be provided to correspond to a distance between the discharge holes of the treatment liquid nozzle situated on the outermost side when viewed from a side on which the light is irradiated.

According to an embodiment of the inventive concept, a direction in which the light is irradiated may be perpendicular to a direction in which the treatment liquid is discharged.

According to an embodiment of the inventive concept, the treatment liquid discharged to the plate may be eliminated by supplying a cleaning liquid to the plate.

According to an embodiment of the inventive concept, the cleaning liquid may be supplied to the center of the plate.

According to an embodiment of the inventive concept, the plate may be rotated while the cleaning liquid is discharged.

According to an embodiment of the inventive concept, the cleaning liquid may be supplied to the plate at the same time when the treatment liquid is discharged.

According to an embodiment of the inventive concept, the cleaning liquid may be supplied to the plate after the treatment liquid is discharged.

According to an embodiment of the inventive concept, the irradiation path of the light may be situated adjacent to a discharge hole of the treatment liquid nozzle.

According to an embodiment of the inventive concept, the light may be irradiated to a path passing through droplets discharged from the discharge holes of the treatment liquid nozzle.

According to an embodiment of the inventive concept, the light may be a laser ray.

According to an embodiment of the inventive concept, the efficiency of a substrate treating apparatus can be improved by providing an inspection unit that inspects a nozzle for supplying liquid to a substrate.

According to an embodiment of the inventive concept, a photographing operation can be effectively performed during an inspection process by providing a diffusion preventing plate adjacent to a light source member to restrict the light width of a light source.

According to an embodiment of the inventive concept, the efficiency of an inspection process can be improved by effectively arranging a light source member and a photographing member.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, exemplary embodiments of the inventive concept will be described in more detail with reference to the accompanying drawings. The embodiments of the inventive concept may be modified in various forms, and the scope of the inventive concept should not be construed to be limited to the following embodiments. The embodiments of the inventive concept are provided to describe the inventive concept for those skilled in the art more completely. Accordingly, the shapes of the components of the drawings are exaggerated to emphasize clearer description thereof.

Figure 1:
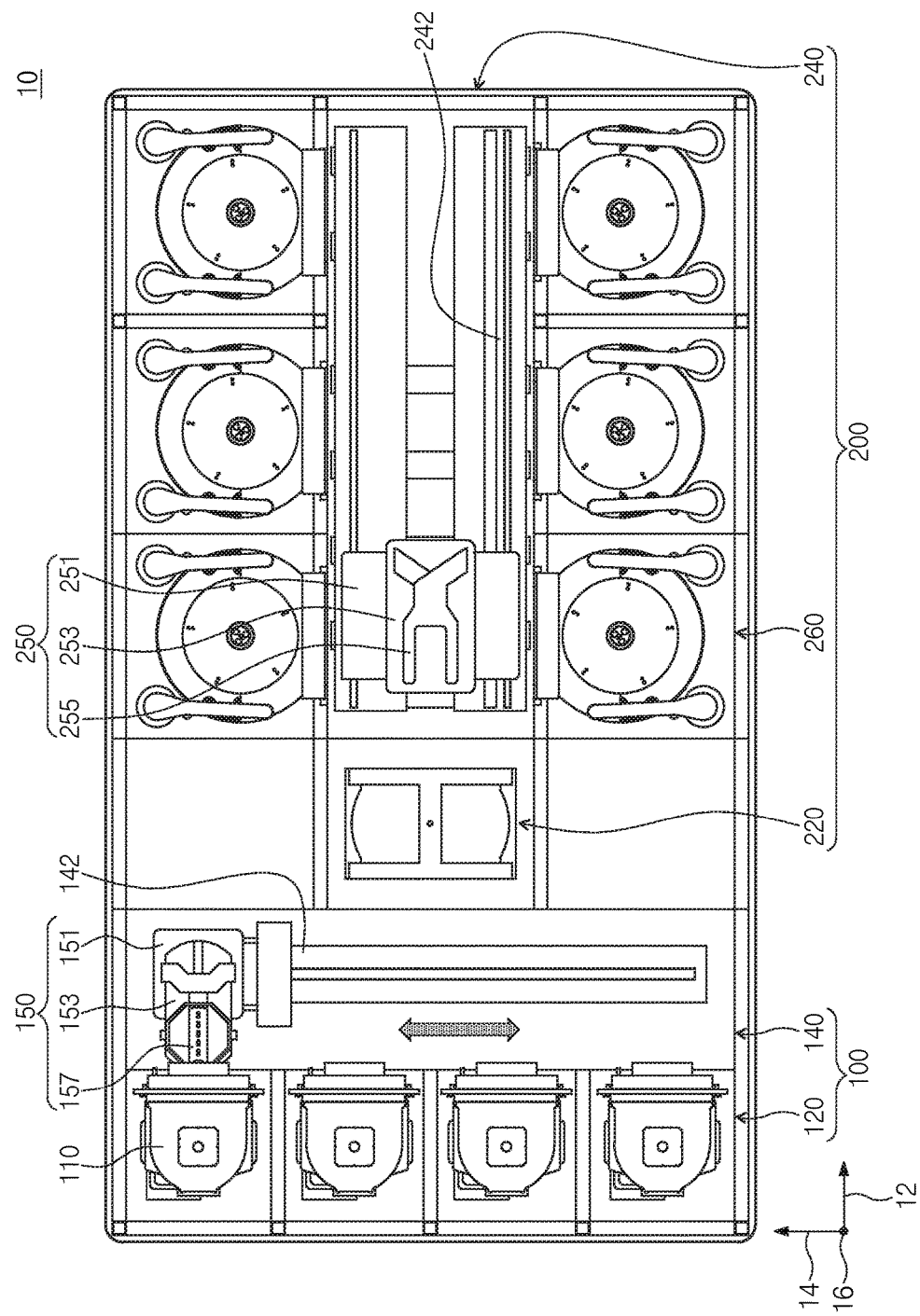
FIG. 1 is a plan view schematically illustrating a substrate treating system according to the inventive concept.

FIG. 1 is a plan view schematically illustrating a substrate treating system according to the inventive concept.

Referring to FIG. 1, the substrate treating system 10 has an index module 100 and a process treating module 200, and the index module 100 includes a plurality of load ports 120 and a feeding frame 140. The load port 120, the feeding frame 140, and the process treating module 200 may be sequentially arranged in a row. Hereinafter, a direction in which the load port 120, the feeding frame 140, and the process treating module 200 are arranged will be referred to as a first direction 12. A direction perpendicular to the first direction 12 when viewed from the top will be referred to as a second direction 14, and a direction normal to a plane including the first direction 12 and the second direction 14 will be referred to as a third direction 16.

A carrier 130, in which a substrate W is received, is seated on the load port 120. A plurality of load ports 120 are provided, and are arranged along the second direction 14 in a row. FIG. 1 illustrates that four load ports 120 are provided. However, the number of the load ports 120 may increase or decrease according to a condition, such as the process efficiency of the process treating module 200 or a footprint. A plurality of slots (not illustrated) provided to support peripheries of substrates are formed in the carrier 130. A plurality of slots are provided along the third direction 16, and the substrate is situated in the carrier 130 such that the substrates are stacked to be spaced apart from each other along the third direction 16. A front opening unified pod (FOUP) may be used as the carrier 130.

The process treating module 200 includes a buffer unit 220, a feeding chamber 240, and a plurality of process chambers 260. The feeding chamber 240 is arranged such that the lengthwise direction thereof is in parallel to the first direction 12. The process chambers 260 are arranged on opposite sides of the feeding chamber 240 along the second direction 14. The process chambers situated on one side of the feeding chamber 240 and the process chambers 260 situated on an opposite side of the feeding chamber 240 are symmetrical to each other with respect to the feeding chamber 240. Some of the process chambers 260 are arranged along the lengthwise direction of the feeding chamber 240. Furthermore, some of the process chambers 260 are arranged to be stacked on each other. That is, the process chambers 260 having an array of A by B (A and B are natural numbers) may be arranged on one side of the feeding chamber 240. Here, A is the number of the process chambers 260 provided in a row along the first direction 12, and B is the number of the process chambers 260 provided in a row along the third direction 16. When four or six process chambers 260 are provided on one side of the feeding chamber 240, the process chambers 260 may be arranged in an array of 2 by 2 or 3 by 2. The number of the process chambers 260 may increase or decrease. Unlike the above-mentioned description, the process chambers 260 may be provided only on one side of the feeding chamber 240. Further, unlike the above-mentioned description, the process chambers 260 may be provided on one side or opposite sides of the feeding chamber 240 to form a single layer.

A buffer unit 220 is arranged between the feeding frame 140 and the feeding chamber 240. The buffer unit 220 provides a space in which the substrates W stay before being transported between the feeding chamber 240 and the feeding frame 140. Slots (not illustrated) in which the substrates W are positioned are provided in the buffer unit 220, and a plurality of slots (not illustrated) are provided to be spaced apart from each other along the third direction 16. Each face of the buffer unit 220 that faces the feeding frame 140 and faces the feeding chamber 240 may be opened.

The feeding frame 140 transports the substrates between the carrier 130 seated on the load port 120 and the buffer unit 220. An index rail 142 and an index robot 150 are provided in the feeding frame 140. The index rail 142 is arranged such that the lengthwise direction thereof is in parallel to the second direction 14. The index robot 150 is installed on the index rail 142, and is linearly moved in the second direction 14 along the index rail 142. The index robot 150 has a base 151, a body 153, and a plurality of index arms 155. The base 151 is installed to be moved along the index rail 142. The body 153 is coupled to the base 151. The body 153 is provided to be moved along the third direction 16 on the base 151. The body 153 is provided to be rotated on the base 151. The index arms 155 are coupled to the body 153, and are provided to be moved forwards and rearwards with respect to the body 153. A plurality of index arms 155 are provided to be driven individually. The index arms 155 are arranged to be stacked so as to be spaced apart from each other along the third direction 16. Some of the index arms 155 are used when the substrates W are transported to the carrier 130 from the process module 200, and others of the index arms 155 may be used when the substrates W are transported from the carrier 130 to the process treating module 200. This structure may prevent particles generated from the substrates W before the process treatment from being attached to the substrates W after the process treatment in the process of carrying the substrates W in and out by the index robot 150.

The feeding chamber 240 transports the substrates W between the buffer unit 220 and the process chambers 260, and between the process chambers 260. A guide rail 242 and a main robot 250 are provided in the feeding chamber 240. The guide rail 242 is arranged such that the lengthwise direction thereof is in parallel to the first direction 12. The main robot 250 is installed on the guide rail 242, and is linearly moved along the first direction 12 on the guide rail 242. The main robot 250 has a base 251, a body 253, and a main arm 255. The base 251 is installed to be moved along the guide rail 242. The body 253 is coupled to the base 251. The body 253 is provided to be moved along the third direction 16 on the base 251. The body 253 is provided to be rotated on the base 251. The main arm 255 is coupled to the body 253, and is provided to be moved forwards and rearwards with respect to the body 253. A plurality of main arms 255 are provided to be driven individually. The main arms 255 are arranged to be stacked so as to be spaced apart from each other along the third direction 16. The main arms 255 used when the substrates are transported from the buffer unit 220 and the process chambers 260 and the main arms 255 used when the substrates are transported from the process chambers 260 to the buffer unit 220 may be different.

Substrate treating apparatuses 300 that perform cleaning processes on the substrates W are provided in the process chambers 260. The substrate treating apparatuses 300 provided in the process chambers 260 may have different structures according to the types of performed cleaning processes. Selectively, the substrate treating apparatuses 300 in the process chambers 260 may have the same structure. Selectively, the process chambers 260 may be classified into a plurality of groups such that the substrate treating apparatuses 300 provided in the process chambers 260 pertaining to the same group have the same structure and the substrate treating apparatuses 300 provided in the process chambers 260 pertaining to different groups has different structures. For example, when the process chambers 260 are classified into two groups, the first group of process chambers 260 may be provided on one side of the feeding chamber 240 and the second group of process chambers 260 may be provided on an opposite side of the feeding chamber 240. Selectively, the first group of process chambers 260 may be provided on the lower side of the feeding chamber 240 and the second group of process chambers 260 may be provided on the upper side of the feeding chamber 240, on opposite sides of the feeding chamber 240. The first group of process chambers 260 and the second group of process chambers 260 may be classified according to the kinds of the used chemicals or the types of cleaning methods.

Hereinafter, a nozzle including a piezoelectric will be described as an example in the embodiment of the inventive concept, but the inventive concept is not limited thereto but may be applied to all of inspection units that inspect a substrate treating apparatus including a nozzle for supplying liquid to a substrate and treat the substrate.

Figure 2:
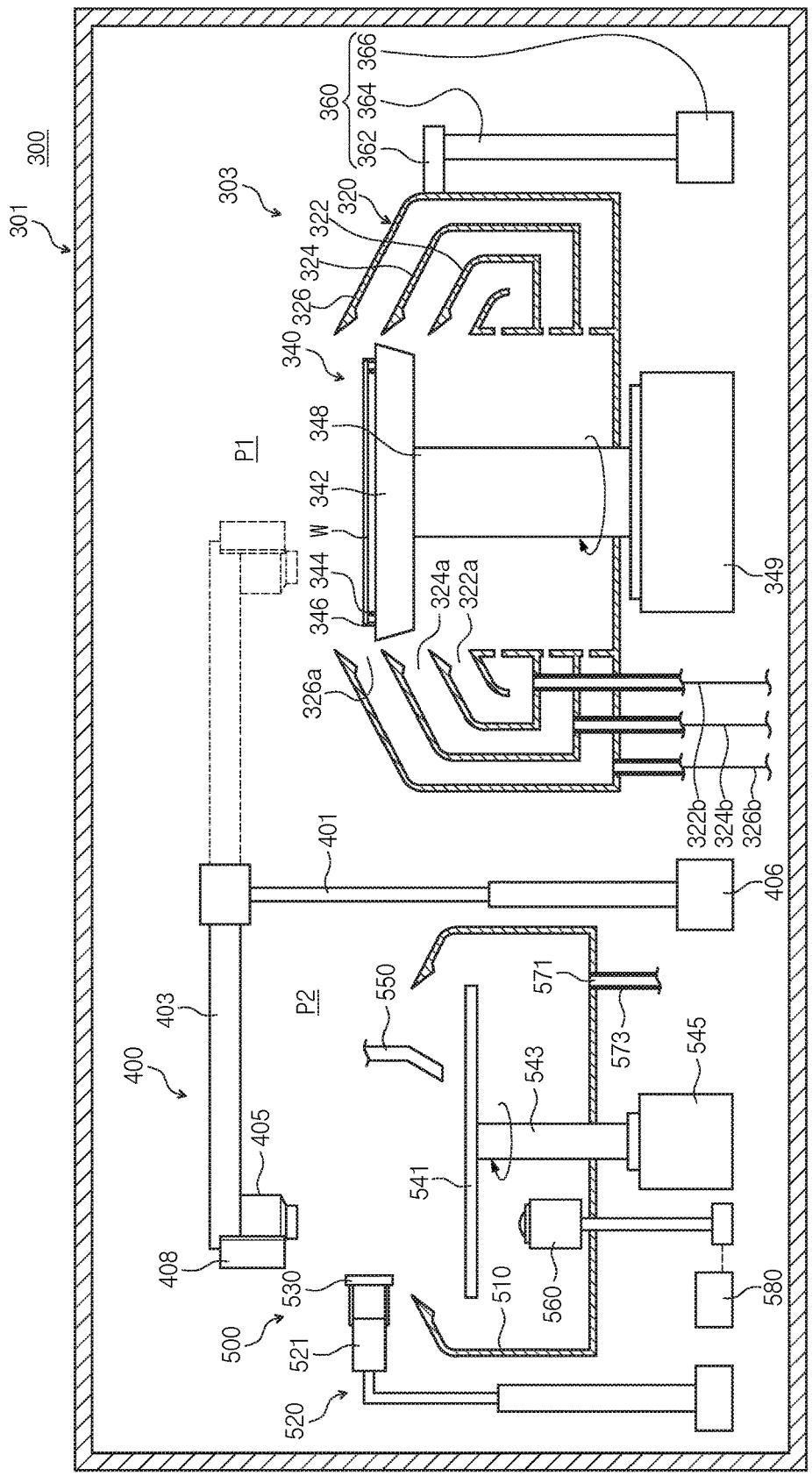
FIG. 2 is a sectional view illustrating a substrate treating apparatus of FIG. 1.

FIG. 2 is a sectional view illustrating a substrate treating apparatus of FIG. 1. Referring to FIG. 2, the substrate treating apparatus 300 includes a housing 301, a treatment unit 303, a nozzle unit 400, and an inspection unit 500.

The housing 301 provides a space in the interior thereof. The housing 301 has a rectangular parallelepiped shape. The treatment unit 303, the nozzle unit 400, and the inspection unit 500 are situated in the interior space of the housing 301.

The treatment unit 303 supplies treatment liquid to a substrate to treat the substrate. The treatment unit 303 includes a container 320, a support member 340, and an elevation member 360.

The container 320 provides a space in which a substrate treating process is performed. The upper side of the container 320 is opened. The container 320 has an inner recovery vessel 322, an intermediate recovery vessel 324, and an outer recovery vessel 326. The recovery vessels 322, 324, and 326 recover different treatment liquids used in the process. The inner recovery vessel 322 is provided to have an annular ring shape that surrounds the support member 340. The intermediate recovery vessel 324 is provided to have an annular ring shape that surrounds the inner recovery vessel 322. The outer recovery vessel 326 is provided to have an annular ring shape that surrounds the intermediate recovery vessel 324. An inner space 322a of the inner recovery vessel 322, a space 324a between the inner recovery vessel 322 and the intermediate recovery vessel 324, a space 326a between the intermediate recovery vessel 324 and the outer recovery vessel 326 function as inlets through which the treatment liquids are introduced into the inner recovery vessel 322, the intermediate recovery vessel 324, and the outer recovery vessel 326 respectively. Recovery lines 322b, 324b, and 326b extending from the recovery vessels 322, 324, and 326 perpendicularly in the downward direction of the bottom surfaces thereof are connected to the recovery vessels 322, 324, and 326, respectively. The recovery lines 322b, 324b, and 326b discharge the treatment liquids introduced through the recovery vessels 322, 324, 326, respectively. The discharged treatment liquids may be reused through an external treatment liquid recycling system (not illustrated).

The support member 340 supports and rotates the substrate W during the process. The support member 340 has a body 342, a plurality of support pins 344, a plurality of chuck pins 346, and a support shaft 348. The body 342 has an upper surface having a substantially circular shape when viewed from the top. The support shaft 348 that may be rotated by a motor 349 is fixedly coupled to the bottom of the body 342.

A plurality of support pins 344 are provided. The support pins 344 may be arranged to be spaced apart from each other at a periphery of the upper surface of the body 342 and protrude upwards from the body 342. The support pins 344 are arranged to have a generally annular ring shape through combination thereof. The support pins 344 support a periphery of a rear surface of the substrate W such that the substrate W is spaced apart from the upper surface of the body 342 by a predetermined distance.

A plurality of chuck pins 346 are provided. The chuck pins 346 are arranged to be more distant from the center of the body 342 than the support pins 344. The chuck pins 346 are provided to protrude upwards from the body 342. The chuck pins 346 support a side of the substrate W such that the substrate W is not separated laterally from a proper place when the support member 340 is rotated. The chuck pins 346 are provided to be linearly moved between a standby position and a support position along a radial direction of the body 342. The standby position is a position that is more distant from the center of the body 342 than the support position. When the substrate W is loaded on or unloaded from the support member 340, the chuck pins 346 are located at the standby position, and when a process is performed on the substrate W, the chuck pins 346 are located at the support position. The chuck pins 346 are in contact with the side of the substrate W at the support position.

The elevation member 360 linearly moves the container 320 upwards and downwards. When the container 320 is moved upwards and downwards, a relative height of the container 320 to the support member 340 is changed. The elevation member 360 has a bracket 362, a movable shaft 364, and a driver 366. The bracket 362 is fixedly installed on an outer wall of the container 320. The movable shaft 364 that is moved upwards and downwards by the driver 366 is fixedly coupled to the bracket 362. The container 320 is lowered such that, when the substrate W is positioned on the support member 340 or is lifted from the support member 340, the support member 340 protrudes to the upper side of the container 320. When the process is performed, the height of the container 320 is adjusted such that the treatment liquid are introduced into the predetermined recovery vessel 360 according to the kind of the treatment liquid supplied to the substrate W. Selectively, the elevation member 360 may move the support member 340 upwards and downwards.

The nozzle unit 400 ejects the treatment liquid onto the substrate W. A plurality of nozzle units 400 may be provided to eject various kinds of treatment liquids or the same kind of treatment liquid in various methods. The nozzle unit 400 includes a support shaft 401, a nozzle arm 403, a treatment liquid nozzle 405, a nozzle driver 406, and a protection liquid nozzle 408.

The support shaft 401 is arranged on one side of the container 320. The support shaft 401 has a rod shape, of which a lengthwise direction is a vertical direction. The support shaft 401 is swung and elevated by the nozzle driver 406. Differently, the support shaft 401 may be linearly moved horizontally and elevated by the nozzle driver 388. A nozzle arm 403 is fixedly coupled to an upper end of the support shaft 401. The nozzle arm 403 supports a treatment liquid nozzle 405 and a protection liquid nozzle 408. The treatment liquid nozzle 405 and the protection liquid nozzle 408 are situated at an end of the nozzle arm 403. For example, the protection liquid nozzle 408 may be situated closer to an end of the nozzle arm 403 than the treatment liquid nozzle 405. When the treatment liquid nozzle 405 discharges the treatment liquid onto the substrate, it locates the treatment liquid nozzle 405 to a discharge position that is an upper side of the substrate. Meanwhile, if the treatment liquid is completely discharged, the treatment liquid nozzle 405 is situated at a cleaning position inside a liquid vessel 472.

The nozzle driver 406 may move the treatment liquid nozzle 405 to a process position P1 and an inspection position P2. Here, the process position P1 is a position at which the treatment unit 303 treats a substrate. At the process position P1, the treatment liquid nozzle 405 is situated on the support member 340. The inspection position P2 is a position at which the treatment liquid nozzle 405 is inspected by the inspection unit 500. At the inspection position P1, the treatment liquid nozzle 405 is situated on a plate 541. The nozzle driver 406 may elevate the treatment liquid nozzle 405 upwards and downwards.

Figure 3:
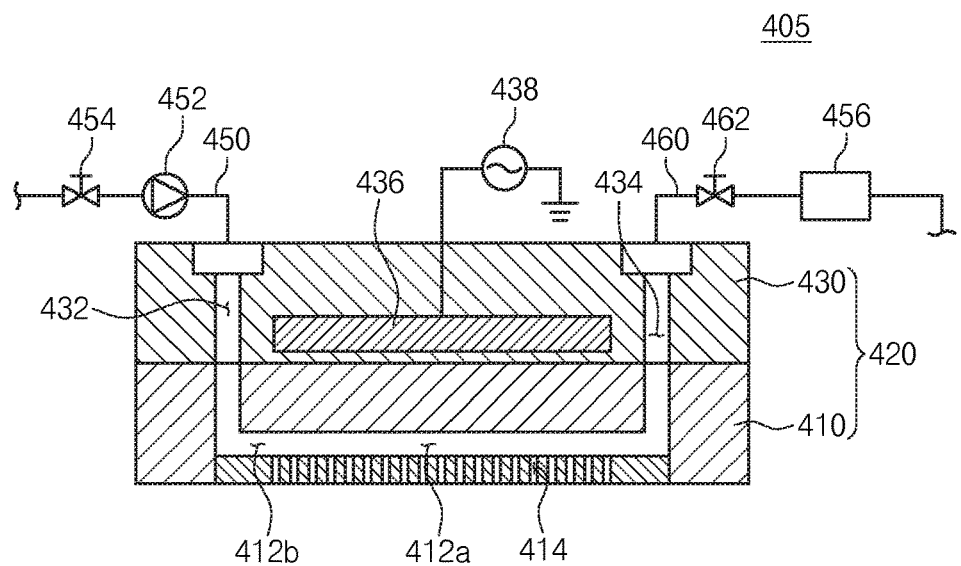
FIG. 3 is a sectional view illustrating a treatment liquid nozzle of FIG. 2.
Figure 4:
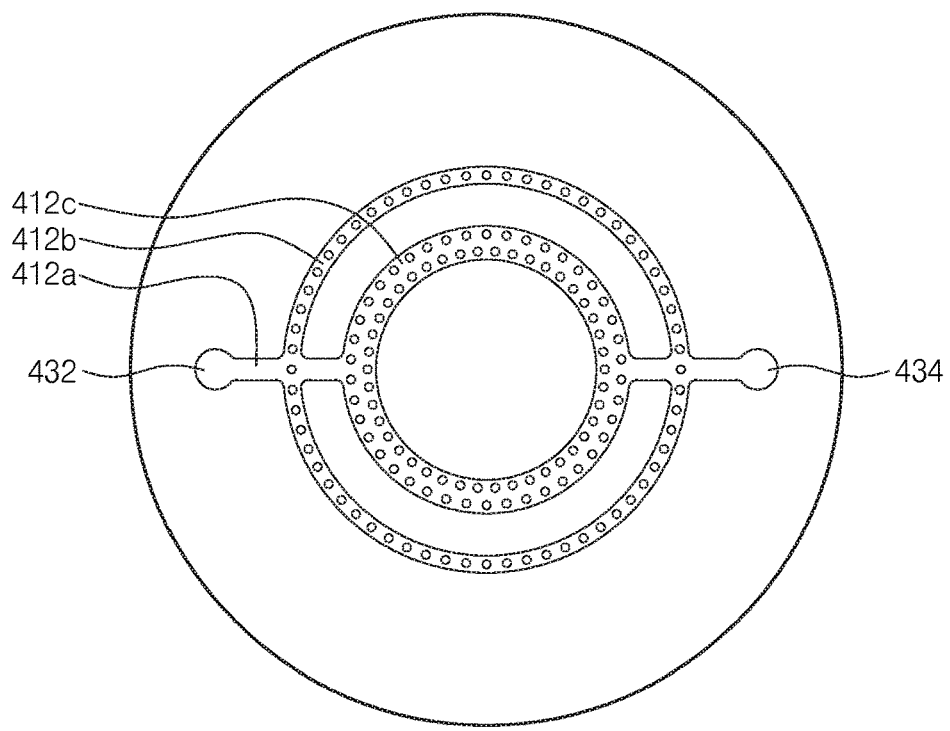
FIG. 4 is a bottom view illustrating the treatment liquid nozzle of FIG. 3.

FIG. 3 is a sectional view illustrating a treatment liquid nozzle according to an embodiment of the inventive concept. FIG. 4 is a bottom view illustrating the treatment liquid nozzle of FIG. 3. Referring to FIGS. 3 and 4, the treatment liquid nozzle 405 ejects treatment liquid onto the substrate. When viewed from the top, the treatment liquid nozzle 405 has a circular shape. The treatment liquid nozzle 405 includes a body 420, a vibrator 436, a treatment liquid supply line 450, and a treatment liquid recovery line 460.

The body 420 has a lower plate 410 and an upper plate 430. The lower plate 410 has a cylindrical shape. An ejection passage 412, through which the treatment liquid flows, is formed in the interior of the lower plate 410. A plurality of first discharge holes 414, through which the treatment liquid is ejected, are formed on the bottom surface of the lower plate 410. The first discharge holes 414 are communicated with the ejection passage 412. A fine hole is formed in the first discharge hole 414.

The ejection passage 412 may include a first area 412b, a second area 412c, and a third area 412a. When viewed from the top, the first area 412b and the second area 412c have ring shapes. The radius of the first area 412b is larger than the radius of the second area 412c. The first discharge holes 414 of the first area 412b may be provided in a row along the first area 412b. The first discharge holes 414 of the second area 412c may be provided in two rows along the second area 412c. The third area 412a connects the first area 412b and the second area 412c to an introduction passage 432. The third area 412a connects the first area 412b and the second area 412c to a recovery passage 434. For example, as illustrated in FIG. 4, the third area 412a may be connected to the introduction passage 432 or the recovery passage 434. The upper plate 430 is provided to have a cylindrical shape having the same diameter as that of the lower plate 410. The upper plate 430 is fixedly coupled to the upper surface of the lower plate 410. The introduction passage 423 and the recovery passage 434 are formed in the interior of the upper plate 430. The introduction passage 432 and the recovery passage 434 are communicated with the second area 412b of the ejection passage 412. The introduction passage 432 functions as an inlet through which the treatment liquid is introduced into the ejection passage 412, and the recovery passage 434 functions as an outlet through which the treatment liquid is recovered from the ejection passage 412. The introduction passage 432 and the recovery passage 434 are situated to face each other with respect to the center of the treatment liquid nozzle 405.

The vibrator 436 is situated in the interior of the upper plate 430. When viewed from the top, the vibrator 436 is provided to have a disk shape. For example, the vibrator 436 is provided to have the same diameter as that of the first area 412b. Selectively, the diameter of the vibrator 436 may be larger than the diameter of the first area 412b and smaller than the diameter of the upper plate 430. The vibrator 436 is electrically connected to a power source 438 situated on the outside. The vibrator 436 provides vibration for the ejected treatment liquid to control the size of particles and the flow rate of the treatment liquid. According to an embodiment of the inventive concept, the vibrator 436 may be a piezoelectric element. The treatment liquid may be provided as a cleaning liquid. For example, the treatment liquid may be electrolyzed water. The electrolyzed water may include any one or all of hydrogen water, oxygen water, ozone water.

The treatment liquid supply line 450 supplies the treatment liquid to the introduction passage 432, and the treatment liquid recovery line 460 recovers the treatment liquid from the recovery passage 434. The treatment liquid supply line 450 is connected to the introduction passage 432. The treatment liquid recovery line 460 is connected to the recovery passage 434. A pump 452 and a supply valve 454 are installed on the treatment liquid supply line 450. A recovery valve 462 is installed on the treatment liquid recovery line 460. The pump 452 pressurizes the treatment liquid supplied from the treatment liquid supply line 450 to the introduction passage 432. The supply valve 454 opens and closes the treatment liquid supply line 450. The recovery valve 462 opens and closes the treatment liquid recovery line 460. According to an embodiment of the inventive concept, when the process is in a standby state, the recovery valve 462 opens the treatment liquid recovery line 460. Accordingly, the treatment liquid is recovered through the treatment liquid recovery line 460, and is not ejected through the first ejection holes 414. Differently, while the process is performed, the recovery valve 462 closes the treatment liquid recovery line 460. Accordingly, the ejection passage 412 is filled with the treatment liquid and the internal pressure of the ejection passage 412 increases, and if an electric voltage is applied to the vibrator 436, the treatment liquid may be ejected through the first ejection holes 414.

Figure 5:
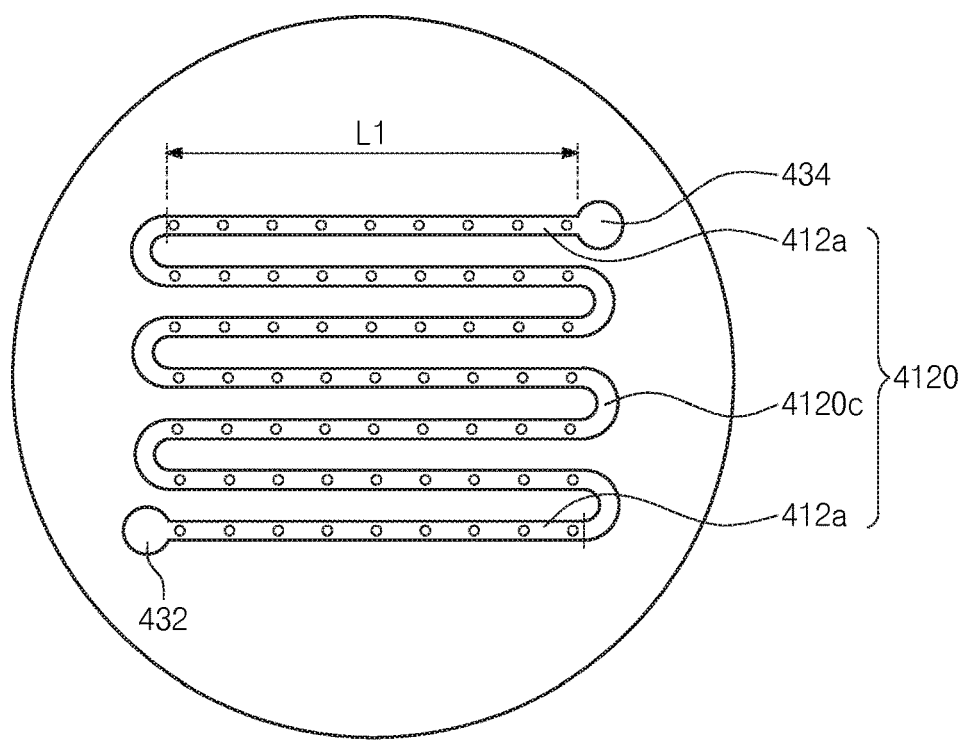
FIG. 5 is a view illustrating another embodiment of an ejection passage of the treatment liquid nozzle of FIG. 2.

FIG. 5 is a view illustrating another embodiment of an injection passage of the treating liquid nozzle of FIG. 2. Hereinafter, referring to FIG. 5, the ejection passage 4120 includes a first ejection passage 4120a, a second ejection passage 4120b, and a third ejection passage 4120c. The first ejection passage 4120a extends from the introduction passage 432. The first ejection passage 4120a may have a first length L1. The second ejection passage 4120b extends from the recovery passage 434. The second ejection passage 4120b is provided in parallel to the first ejection passage 4120a. The second ejection passage 4120b may have a first length L1. The third ejection passage 4120c connects the first ejection passage 4120a and the second ejection passage 4120b. The third ejection passage 4120c is provided to be curved. A portion of the third ejection passage 4120c may be provided to be parallel to the first ejection passage 4120a and to have a first length L1. For example, the third ejection passage 4120c may be provided to have a shape in which a plurality of U shapes are connected to each other. Selectively, the third ejection passage 4120c may be provided to have various shapes.

Referring back to FIG. 2, the protection liquid nozzle 408 supplies liquid onto the substrate. The protection liquid nozzle 408 supplies liquid at the same time when the treatment liquid is supplied by the treatment liquid nozzle 405. Then, the protection liquid nozzle 408 may supply liquid first before the treatment liquid nozzle 405 starts to supply the treatment liquid. For example, the protection liquid nozzle 408 may eject the liquid in a drop manner. The protection liquid nozzle 408 is provided to surround a portion of the treatment liquid nozzle 405. The protection liquid nozzle 408 is situated closer to an end of the nozzle arm 382 than the treatment liquid nozzle 405. The protection liquid nozzle 408 has a second discharge hole (not illustrated) through which liquid is discharged onto the substrate perpendicularly to the substrate. The protection liquid nozzle 408 is provided to have an arc shape that surrounds the treatment liquid nozzle 405 when viewed from the top. A linear distance between the opposite ends of the protection liquid nozzle 408 may be larger than the diameter of the treatment liquid nozzle 405. Then, the treatment liquid nozzle 405 and the protection liquid nozzle 408 may be concentric. The liquid is provided as a protection liquid. For example, the liquid may be a solution containing ammonia and hydrogen peroxide. The liquid forms a liquid film on the substrate W, and the liquid film alleviates an impact applied to the substrate W by the treatment liquid. Accordingly, the pattern on the substrate W can be prevented from being fallen by the treatment liquid. The liquid may be pure water. The second discharge hole may be provided to have a single slit shape. Selectively, the second discharge hole may include a plurality of circular discharge holes. The protection liquid nozzle 408 may eject liquid to an area adjacent to the area of the substrate W, to which the treatment liquid is ejected. The area, to which the liquid is ejected, may be closer to a central area of the substrate W than the area, to which the treatment liquid is ejected. Selectively, the protection liquid nozzle 408 may be provided to have a bar shape instead of an arc shape.

The inspection unit 500 inspects whether the treatment liquid supplied by the treatment liquid nozzle 405 is normally discharged. The inspection unit 500 includes a cup 510, a plate 541, a light source member 520, a diffusion preventing plate 530, a cleaning nozzle 550, a photographing member 560, and a determination member 580.

The cup 510 prevents the treatment liquid from spattering to the outside when the treatment liquid is removed from the upper side of the plate 541 with the liquid supplied by the cleaning nozzle 550. The cup 510 has a space, of which the upper side is opened, in the interior thereof. The cup 510 is provided to have an opened upper side. A discharge hole 571, through which the liquid is discharged, is formed on the bottom surface of the cup 510. The discharge hole 571 is connected to a discharge line 573 situated on the outside. The discharge line 573 extends from the bottom of the cup 510 downwards perpendicularly to the bottom of the cup 510. The discharge line 573 discharges the liquid introduced through the cup 510 to the outside.

A plate 541 and a support 543 are situated in the interior space of the cup 510. When the inspection unit 500 inspects the treatment liquid nozzle 405, the treatment liquid is discharged to the upper surface of the plate 541 from the nozzle 405. The plate 541 is provided to have a circular plate shape. The plate 541 is formed of a transparent material. Here, the transparent material refers to a material having a transparency by which the treatment liquid is identified when the treatment liquid is photographed by the photographing member 560.

An upper area that faces the plate 541 is an inspection position P2. When the nozzle unit 400 is situated at the inspection position P2, the plate 541 is situated below the nozzle unit 400.

The support 543 is coupled to the bottom surface of the plate 541. The support 543 is fixedly coupled to the center of the plate 541.

A rotation driving unit 535 is coupled to the support 543. The rotation driving unit 545 rotates the plate 541. For example, the rotation driving unit 545 may be a motor.

The light source member 520 irradiates light onto the path of the treatment liquid discharged from the treatment liquid nozzle 405, from the inspection position P2 towards the plate 541. The light source member 520 is situated outside the cup 510. The light source member 520 is arranged such that the path of the light irradiated from the light source member 520 and the discharge path of the treatment liquid discharged from the treatment liquid nozzle 045 are perpendicular to each other. The light source member 520 is arranged such that the light path passes through a location adjacent to the discharge hole of the treatment liquid nozzle 405. The light source member 520 includes a light source 521 and a driver 523.

The light source 521 irradiates light onto the path of the treatment liquid supplied to the plate 541. The light source 521 irradiates light to an area between the treatment liquid nozzle 405 and the plate 541. The light source 521 irradiates light in a direction parallel to the plate 541. For example, the light of the light source 521 may be a laser ray.

The driver 523 may move the light source 521 upwards and downwards. The driver 523 is coupled to the light source 521. Selectively, the position of the light source 523 may be fixed while the driver 523 is not provided.

Figure 6:
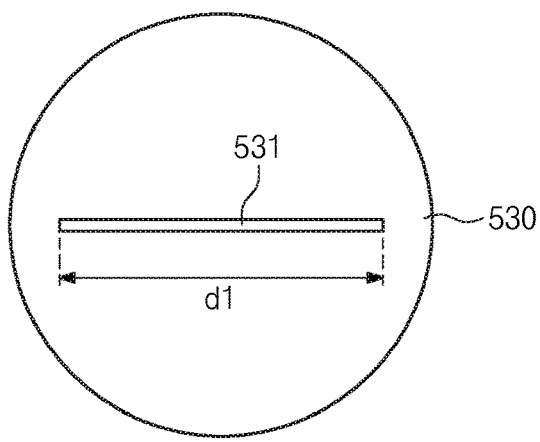
FIG. 6 is a sectional view illustrating a diffusion preventing plate of FIG. 2.
Figure 7:
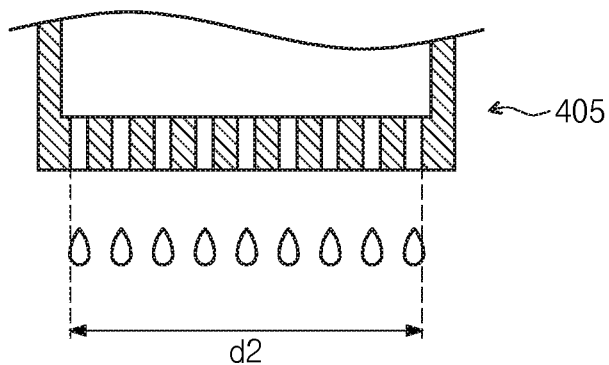
FIG. 7 is a view schematically illustrating the light width of light irradiated from a light member.
Figure 8:
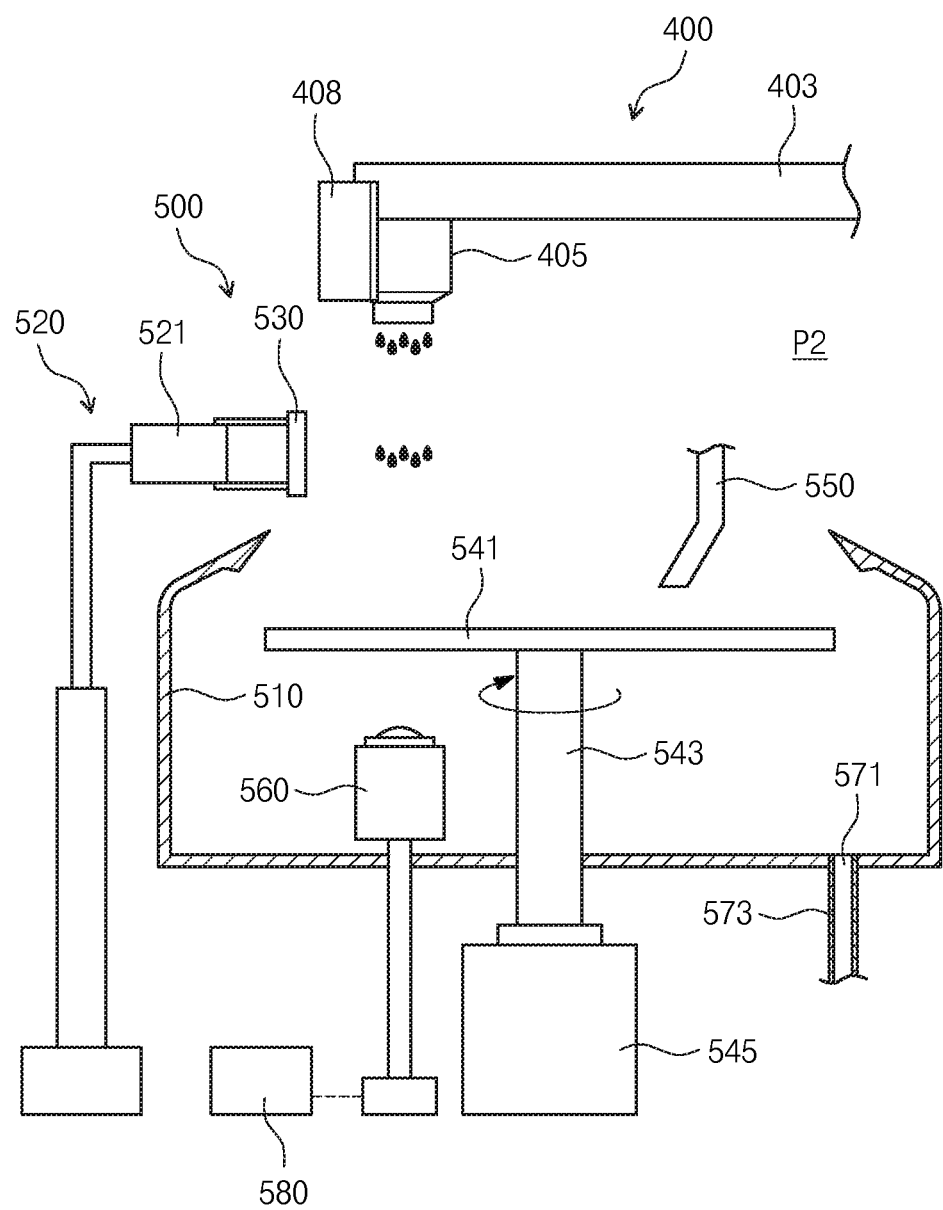
FIGS. 8 to 12 are views illustrating an inspection method according to an embodiment of the inventive concept.
Figure 9:
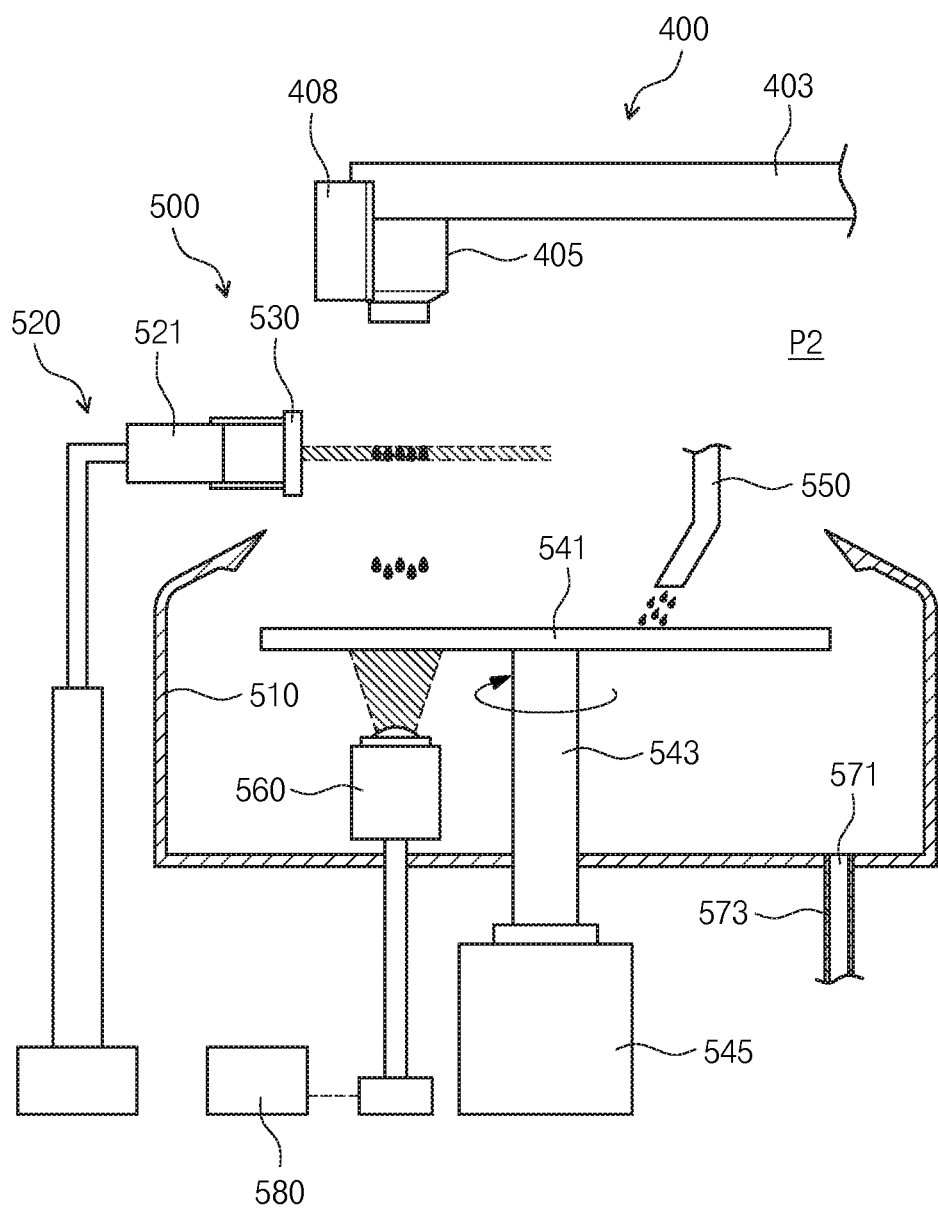
Figure 10:
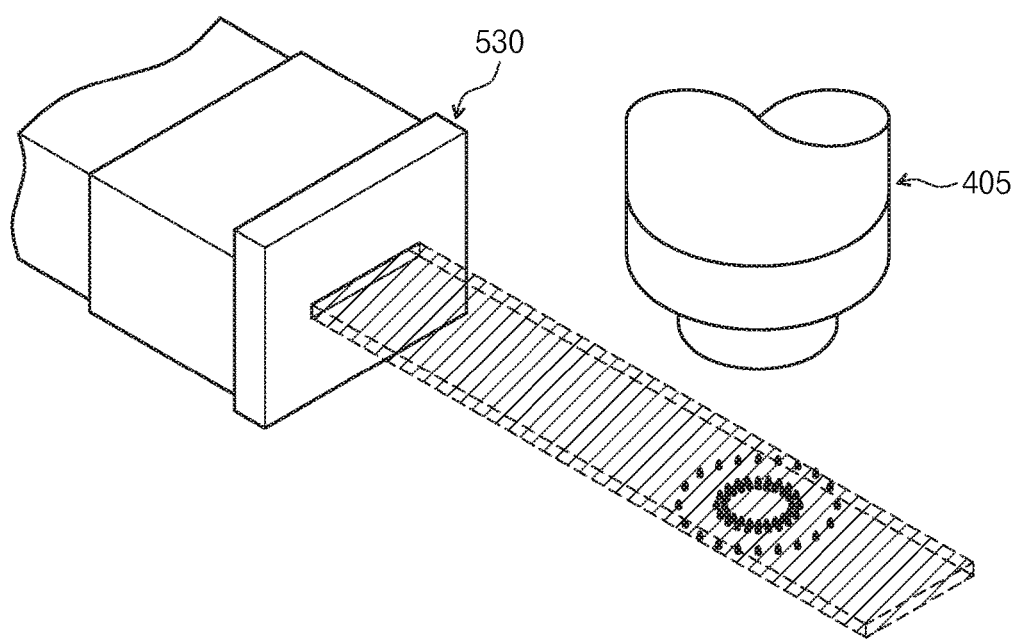
Figure 11:
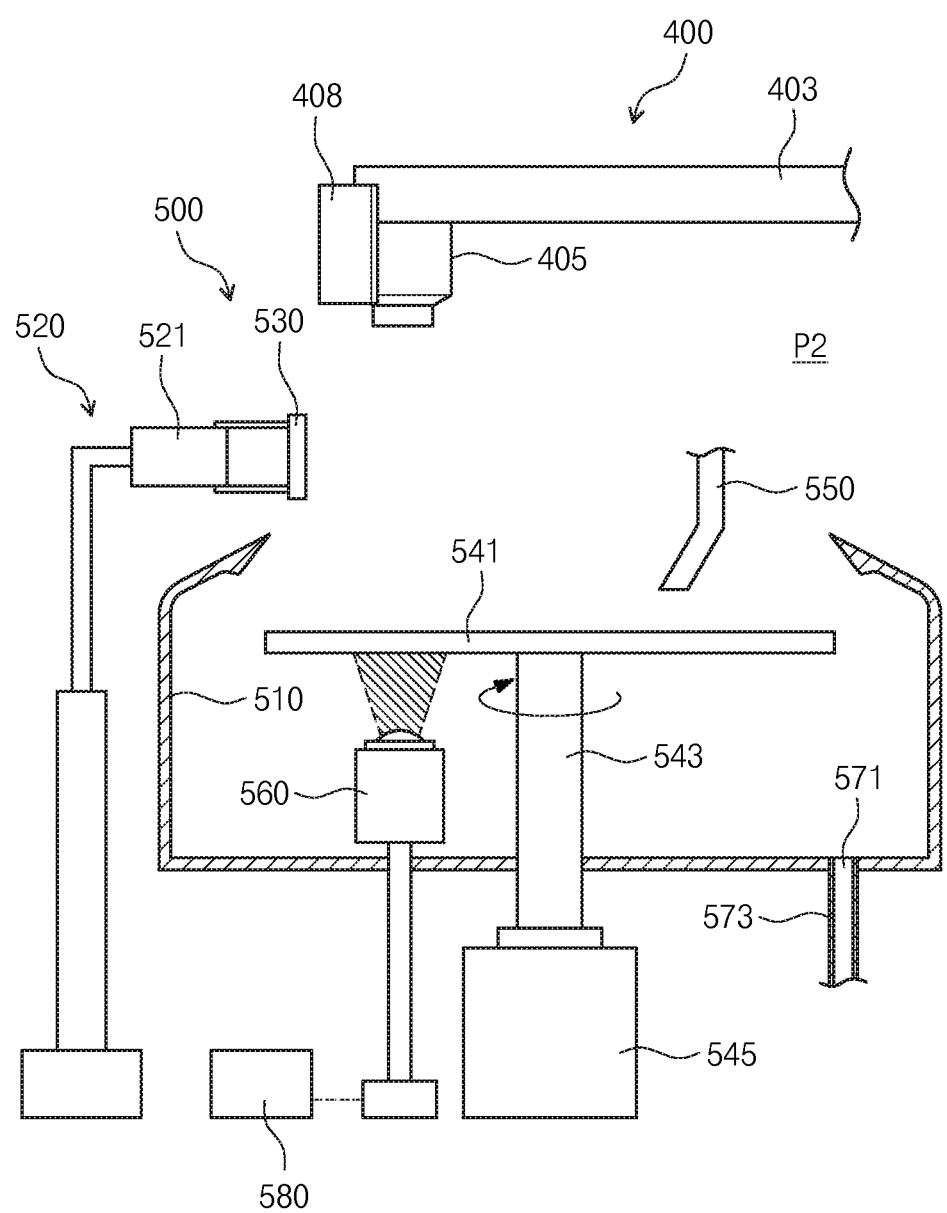
Figure 12:
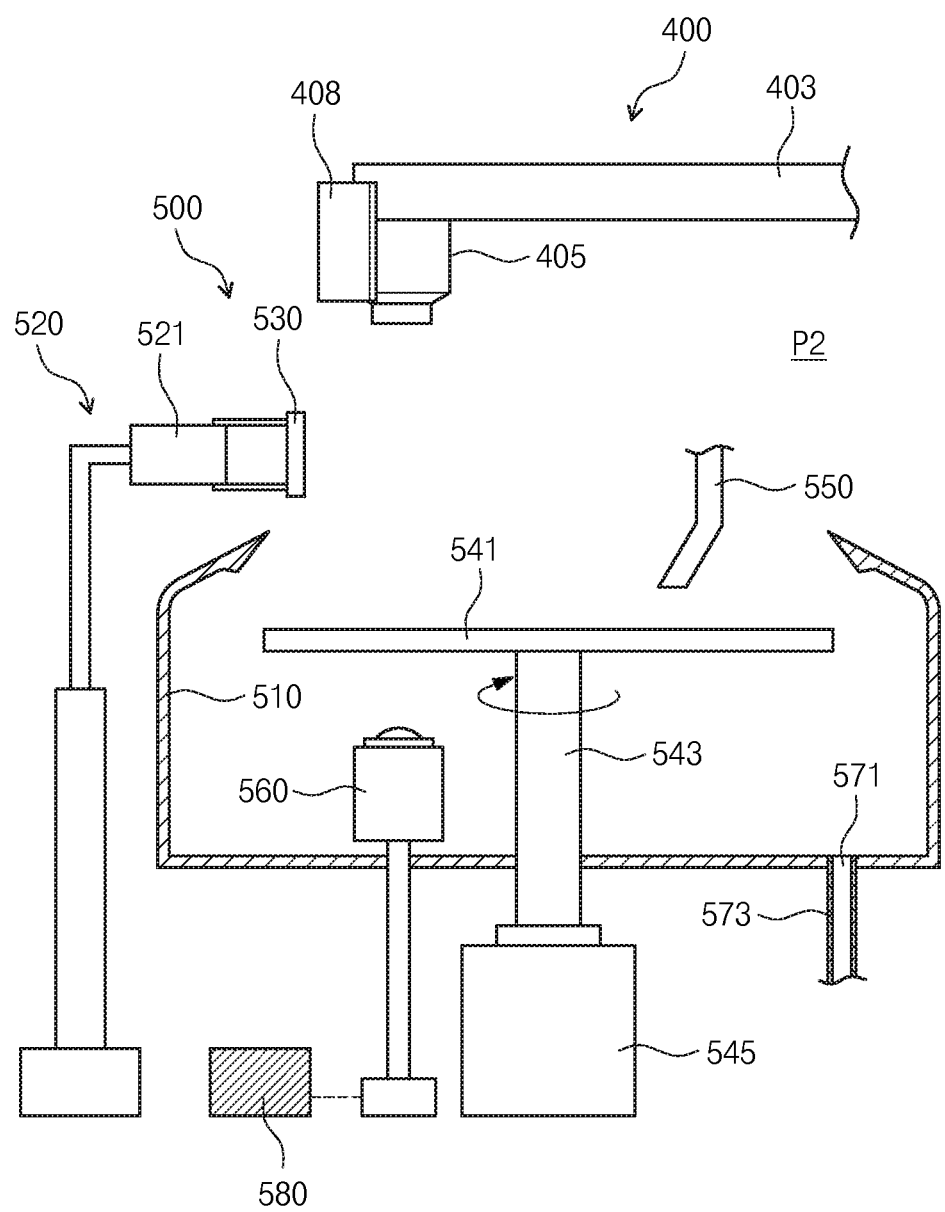

The diffusion preventing plate 523 restricts the light width of the light irradiated by the light source member 520. The diffusion preventing plate 530 is coupled to the light source member 520. The diffusion preventing plate 530 is spaced from the light source 521. The diffusion preventing plate 530 may be situated between the discharge path of the treatment liquid and the light source 521. The diffusion preventing plate 530 is provided to have a circular plate shape when viewed from a side on which the light is irradiated. The diffusion preventing plate 530 is situated closer to the treatment liquid nozzle 405 than the light source member 520. When viewed from the top, the diffusion preventing plate 530 is situated closer to the treatment liquid nozzle 405 that the light source member 520. A slit 531 is formed in the diffusion preventing plate 530. The slit 531 is formed at a central area of the diffusion preventing plate 530. The slit 531 restricts the light width of the light irradiated by the light source member 520. The width d1 of the slit 531 is provided to correspond to the distance d2 between the discharge holes situated on the outside when viewed from a side on which the light is irradiated. Here, the distance between the discharge holes refers to a distance d2 between the opposite ends of the discharge holes as illustrated in FIG. 6. The corresponding distance d2 of the discharge holes refers to a distance that is the same as or slightly larger than the width d1 of the slit 531.

The cleaning nozzle 550 supplies a cleaning liquid onto the upper surface of the plate 541. The cleaning liquid cleans the treatment liquid discharged to the upper surface of the plate 541. The cleaning nozzle 550 is situated above the plate 541. The cleaning nozzle 570 is situated on one side of an imaginary line C passing through the center of the plate 541. The treatment liquid nozzle 405 and the photographing member 560 are situated on an opposite side of the imaginary line C passing through the center of the plate 541. A discharge line of the cleaning nozzle 550 is provided to be inclined towards the center of the plate 541. The cleaning nozzle 550 discharges the cleaning liquid to the center of the plate 541. For example, the supplied cleaning liquid may be pure water. The cleaning liquid may be supplied to the plate 541 at the same time when the treatment liquid is supplied. Differently, the cleaning liquid may be supplied to the plate 541 after the treatment liquid is supplied.

The photographing member 560 photographs the treatment liquid discharged from the treatment liquid nozzle 405. The photographing member 560 is situated below the plate 541. A portion of the photographing member 560 is situated in the interior of the cup 510. The photographing member 560 is situated such that the photographing direction thereof faces a direction in which the treatment liquid nozzle 405 discharges the treatment liquid. The photographing member 560 is situated to face the treatment liquid nozzle 405 at the inspection position P2. The photographing member 560 is situated below the plate 541 between a central area and a peripheral area of the plate 541. The light source member 520 and the photographing member 560 may be arranged such that the direction in which light is irradiated and the direction in which the light is photographed by the photographing member 560 are perpendicular to each other. For example, the photographing member 560 may be a charge-coupled camera (CCD)

The determination member 580 determines whether the treatment liquid discharged from the treatment liquid nozzle 405 is normally discharged, from an image photographed by the photographing member 560. The determination member 580 is connected to the photographing member 560. The determination member 580 receives an image photographed by the photographing member 560. For example, the determination member 580 detects whether any discharge error is present in the discharge holes. A discharge error includes a case in which a discharge hole is blocked so that the treatment liquid is not discharged or the discharge amount is smaller than a normal amount.

Although it has been described that the inventive concept includes the configurations of the diffusion preventing plate 520, the cup 510, the cleaning nozzle 550, some or all of the configurations of the diffusion preventing plate 520, the cup 510, and the cleaning nozzle 550 may not be provided.

Furthermore, it has been described as an example in the embodiment of the inventive concept that the treatment liquid nozzle 405 includes the configuration of the vibrator 436, the inventive concept is not limited to the treatment liquid nozzle but may be all treatment liquid nozzles that discharge the treatment liquid to a substrate to treat the substrate.

Hereinafter, an inspection method of inspecting the nozzle unit 400 of the substrate treating apparatus 300 will be described.

Figure 13:
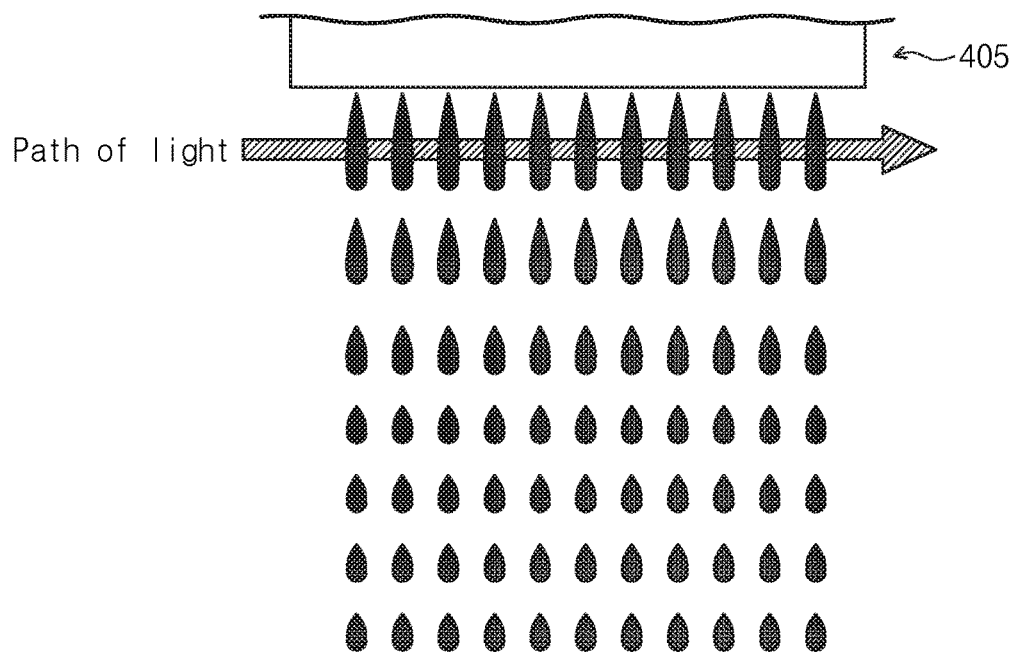
FIG. 13 is a view schematically illustrating that light is irradiated to treatment liquid discharged from a treatment liquid nozzle.

When the nozzle unit 400 is inspected by the inspection unit 500, the nozzle unit 400 is moved to the inspection position P2. The nozzle unit 400 situated at the inspection position P2 discharges the treatment liquid to the plate 541. The plate 541 is rotated while the treatment liquid is discharged. The light source member 520 irradiates light onto the path in which the treatment liquid is discharged. For example, the light irradiated by the light source may be a laser ray. The treatment liquid discharged from the treatment liquid nozzle 405 is included in the light width of the light irradiated by the light source. For example, as illustrated in FIG. 13, the treatment liquid discharged from the treatment liquid nozzle 405 has different lengths of droplets according to the location thereof. The vertical lengths of the droplets are long at a location adjacent to the discharge hole. Thereafter, the lengths of the droplets become gradually smaller as it goes downwards, and predetermined sizes of droplets are supplied towards the plate 541. Then, all the irradiation paths of light pass through all of the droplets most adjacent to the discharge hole.

After the light is irradiated, the photographing member 560 photographs the treatment liquid below the plate 541. The photographed image is transmitted to the determination member 580. The determination member 580 determines whether the treatment liquid is normally discharged from the discharge holes, from the photographed image.

The treatment liquid discharged to the plate 541 is eliminated by supplying a cleaning liquid from the cleaning nozzle 550. The cleaning liquid is supplied by the cleaning nozzle 550 situated above the plate 541. The cleaning nozzle 550 supplies a cleaning liquid to the center of the plate 541. The plate 541 is rotated while the cleaning liquid is supplied. The cleaning liquid may be supplied to the plate 541 at the same time when the treatment liquid is discharged. Differently, after the treatment liquid is discharged, the treatment liquid may be eliminated by supplying the cleaning liquid to the plate 541.

As an embodiment of the inventive concept, the light source is a laser ray. The laser ray has a better straightness than other light sources such as a halogen lamp. Furthermore, the light width is restricted to prevent light from being diffused when the light is irradiated onto the path in which the treatment liquid is discharged through the diffusion preventing plate 530 adjacent to the light source member 520. Furthermore, the direction in which the light is irradiated from the light source member 520 and the direction in which the light is photographed by the photographing member 560 are perpendicular to each other. According to the embodiment of the inventive concept, when the droplets that are most distant from the light source are photographed, the photographed image can be restrained from being distorted due to the scattering or diffusion of light, by using the straightness and the photographing direction of the light.

The above-mentioned detailed description exemplifies the inventive concept. Furthermore, the above-mentioned contents describe the exemplary embodiment of the inventive concept, and the inventive concept may be used in various other combinations, changes, and environments. That is, the inventive concept can be modified and corrected without departing from the scope of the inventive concept that is disclosed in the specification, the equivalent scope to the written disclosures, and/or the technical or knowledge range of those skilled in the art. The written embodiment describes the best state for implementing the technical spirit of the inventive concept, and various changes required in the detailed application fields and purposes of the inventive concept can be made. Accordingly, the detailed description of the inventive concept is not intended to restrict the inventive concept in the disclosed embodiment state. Furthermore, it should be construed that the attached claims include other embodiments.

What is claimed is:

1. A substrate treating apparatus, comprising:
a treatment unit configured to treat the substrate, the treatment unit comprising a container, and a support member situated in an interior of the container to support a substrate;
a nozzle unit having a treatment liquid nozzle for supplying a treatment liquid to the substrate provided in the treatment unit; and
an inspection unit configured to inspect whether the treatment liquid is normally discharged from the treatment liquid nozzle,
wherein the nozzle unit further comprises a nozzle driver configured to move the treatment liquid nozzle from a process position at which the substrate is treated by the treatment unit and an inspection position at which the treatment liquid nozzle is inspected by the inspection unit, and
wherein the inspection unit includes,
a plate of a transparent material, the plate being positioned vertically below the nozzle unit at the inspection position,
a photographing member positioned underneath the plate,
a light source member configured to irradiate light onto a path of the treatment liquid discharged from the treatment liquid nozzle onto the plate at the inspection position, and
a determination member configured to determine whether the treatment liquid is normally discharged, from an image photographed by the photographing member,
wherein the light source member and the photographing member are arranged such that a direction in which the light is irradiated onto the treatment liquid and a direction in which the photographing member is configured to photograph the treatment liquid are perpendicular to each other.

2. The substrate treating apparatus of claim 1, wherein the inspection unit further comprises a diffusion preventing plate configured to restrict a light width of the light irradiated from the light source member.

3. The substrate treating apparatus of claim 2, wherein a slit is configured to be formed in the diffusion preventing plate, and the light width is restricted by the slit.

4. The substrate treating apparatus of claim 3, wherein the treatment liquid nozzle comprises a plurality of discharge holes, and a width of the slit is provided to correspond to a distance between the outermost discharge holes of the discharge holes when viewed from a side on which the light is irradiated.

5. The substrate treating apparatus of claim 2, wherein the diffusion preventing plate is closer to the treatment liquid nozzle than the light source member when viewed from the top.

6. The substrate treating apparatus of claim 1, wherein the inspection unit further comprises a rotation driving unit configured to rotate the plate about the center thereof.

7. The substrate treating apparatus of claim 6, wherein the photographing member is between a central area and a peripheral area of the plate.

8. The substrate treating apparatus of claim 1, wherein the photographing member faces the treatment liquid nozzle at the inspection position.

9. The substrate treating apparatus of claim 1, wherein the inspection unit further comprises a driver configured to move the light source member upwards and downwards.

10. The substrate treating apparatus of claim 1, wherein the treatment liquid nozzle comprises a plurality of discharge holes, and the light source member is arranged such that if the treatment liquid nozzle is at the inspection position, the path of the light passes through a location adjacent to the discharge holes.

11. The substrate treating apparatus of claim 1, wherein the light irradiated from the light source member is a laser ray.

12. The substrate treating apparatus of claim 1, wherein the inspection unit further comprises a cleaning nozzle configured to supply a cleaning liquid to the plate such that the treatment liquid supplied onto the plate is eliminated.

13. The substrate treating apparatus of claim 12, wherein the cleaning nozzle configured to supply the cleaning liquid to the center of the plate.

14. The substrate treating apparatus of claim 13, wherein the cleaning nozzle is on one side of an imaginary line passing through the center of the plate, the line having a perpendicular orientation relative to the plate, the treatment liquid nozzle and the photographing member are on an opposite side of the imaginary line, and
a discharge line of the cleaning nozzle is inclined towards the center of the plate.

15. The substrate treating apparatus of claim 1, wherein the inspection unit further comprises a cup provided to surround the plate.

16. The substrate treating apparatus of claim 1, wherein the treatment liquid nozzle comprises:
a body having an ejection passage, and a discharge hole connected to the ejection passage and configured to eject the treatment liquid; and
a vibrator above the ejection passage and configured to pressurize the treatment liquid flowing through the ejection passage in the body.

17. The substrate treating apparatus of claim 1, wherein the support member is configured to rotate the substrate around a central axis of the substrate during treatment of the substrate.

18. An inspection unit that inspects whether a treatment liquid is normally discharged from a treatment liquid nozzle for supplying the treatment liquid to a substrate, the inspection unit comprising:
a plate of a transparent material, the plate being positioned vertically below the treatment liquid nozzle;

a photographing member positioned underneath the plate;

a light source member positioned above the plate, the light source member configured to irradiate light onto a path of the treatment liquid discharged from the treatment liquid nozzle onto the plate at an inspection position; and a determination member configured to determine whether the treatment liquid is normally discharged, from an image photographed by the photographing member, wherein the light source member and the photographing member are arranged such that a direction in which the light is irradiated and a direction in which the photographing member is configured to photograph the treatment liquid are perpendicular to each other.

19. The inspection unit of claim 18, wherein the inspection unit further comprises a diffusion preventing plate configured to restrict a light width of the light irradiated from the light source member.

20. The inspection unit of claim 19, wherein a slit is configured to be formed in the diffusion preventing plate, and the light width is configured to be restricted by the slit.

* * * * *